(12) United States Patent
Ball et al.

(10) Patent No.: US 9,548,500 B2
(45) Date of Patent: Jan. 17, 2017

(54) CARBON SUPPORTED CATALYST

(71) Applicants: JOHNSON MATTHEY FUEL CELLS LIMITED, London (GB); TIMCAL LIMITED, Bodio (CH)

(72) Inventors: Sarah Caroline Ball, Oxon (GB); Graham Alan Hards, Berkshire (GB); Marlene Rodlert, Breganzona (CH); Jonathan David Brereton Sharman, Berkshire (GB); Michael E Spahr, Bellinzona (CH)

(73) Assignees: JOHNSON MATTHEY FUEL CELLS LIMITED, London (GB); IMERYS GRAPHITE & CARBON SWITZERLAND LTD., Bodio (CH)

(*) Notice: Subject to any disclaimer, the term of this patent is extended or adjusted under 35 U.S.C. 154(b) by 48 days.

(21) Appl. No.: 14/345,754

(22) PCT Filed: Sep. 19, 2012

(86) PCT No.: PCT/GB2012/052306
§ 371 (c)(1),
(2) Date: Mar. 19, 2014

(87) PCT Pub. No.: WO2013/045894
PCT Pub. Date: Apr. 4, 2013

(65) Prior Publication Data
US 2014/0295316 A1 Oct. 2, 2014

(30) Foreign Application Priority Data
Sep. 28, 2011 (GB) .................................. 1116713.7

(51) Int. Cl.
*H01M 4/96* (2006.01)
*H01M 4/90* (2006.01)
(Continued)

(52) U.S. Cl.
CPC ............ *H01M 4/9083* (2013.01); *C01B 31/10* (2013.01); *H01M 4/9041* (2013.01);
(Continued)

(58) Field of Classification Search
None
See application file for complete search history.

(56) References Cited

U.S. PATENT DOCUMENTS

| 5,240,893 A | 8/1993 | Witherspoon |
| 6,110,330 A | 8/2000 | Lin et al. |

(Continued)

FOREIGN PATENT DOCUMENTS

| CN | 102646839 | 8/2012 |
| EP | 0731520 | 9/1996 |

(Continued)

OTHER PUBLICATIONS

O.V. Cherstiouk et al., "Microstructure effects on the electrochemical corrosion of carbon materials and carbon-supported Pt catalysts", Electrochimica Acta, Elsevier, Jul. 23, 2010, vol. 55, pp. 8453-8460, Novosibirsk, Russia.

(Continued)

*Primary Examiner* — Tracy Dove
(74) *Attorney, Agent, or Firm* — Young & Thompson

(57) ABSTRACT

A catalyst includes (i) a primary metal or alloy or mixture including the primary metal, and (ii) an electrically conductive carbon support material for the primary metal or alloy or mixture including the primary metal, wherein the carbon support material: (a) has a specific surface area (BET) of 100-600 $m^2/g$, and (b) has a micropore area of 10-90 $m^2/g$.

32 Claims, 1 Drawing Sheet

MEA performance at 50kPa gauge, 30%RH cathode/30%RH anode, 80°C, Air:Hydrogen stoichiometry 2:2 ($O_2$:$H_2$)

(51) Int. Cl.
*H01M 4/92* (2006.01)
*C01B 31/10* (2006.01)
*H01M 8/10* (2016.01)

(52) U.S. Cl.
CPC ......... *H01M 4/926* (2013.01); *H01M 8/1004* (2013.01); *C01P 2006/12* (2013.01); *H01M 2008/1095* (2013.01); *Y02E 60/50* (2013.01)

(56) References Cited

U.S. PATENT DOCUMENTS

| | | | |
|---|---|---|---|
| 6,254,978 | B1 | 7/2001 | Bahar et al. |
| 7,358,004 | B2 * | 4/2008 | Igarashi ............... C09C 1/50 423/449.1 |
| 2003/0017379 | A1 | 1/2003 | Menashi |
| 2003/0060361 | A1 | 3/2003 | Chen et al. |
| 2004/0248730 | A1 | 12/2004 | Kim et al. |
| 2006/0286434 | A1 | 12/2006 | Evans et al. |
| 2009/0053575 | A1 | 2/2009 | Knights et al. |
| 2010/0237295 | A1 | 9/2010 | Bose et al. |
| 2011/0207969 | A1 | 8/2011 | Olken et al. |
| 2011/0223494 | A1 | 9/2011 | Feaver et al. |
| 2013/0029234 | A1 | 1/2013 | Roev et al. |

FOREIGN PATENT DOCUMENTS

| | | |
|---|---|---|
| EP | 0814897 | 9/1996 |
| EP | 0875524 | 11/1998 |
| EP | 2 077 151 A1 | 7/2009 |
| EP | 2 468 701 A1 | 6/2012 |
| JP | 2005-510828 A | 4/2005 |
| JP | 2007-294332 A | 11/2007 |
| JP | 2010-182692 A | 8/2010 |
| JP | 2013-026148 | 2/2013 |
| WO | 02/084767 A2 | 10/2002 |
| WO | 2005-020356 | 3/2005 |
| WO | 2012-071668 | 6/2012 |
| WO | 2013-045894 | 4/2013 |

OTHER PUBLICATIONS

International Search Report, dated Jan. 16, 2013, from corresponding PCT application.
GB Search Report, dated Feb. 1, 2012, from corresponding GB application.
EP Office Action, dated Oct. 8, 2015; Application No. 12 766 322.7.
Anderson et al., "Catalysts: Science and Technology," vol. 6, 1984, p. 257.
Ball et al., "An investigation into factors affecting the stability of carbons and carbon supported platinum and platinum/cobalt alloy catalysts during 1.2 V potentiostatic hold regimes at a range of temperatures," Journal of Power Sources, vol. 171, 2007, pp. 18-25.
Tran et al., "Investigation of the gas-diffusion-electrode used as lithium/air cathode in non-aqueous electrolyte and the importance of carbon material porosity," Journal of Power Sources, vol. 195, 2010, pp. 2057-2063.
Donnet, "Carbon black: science and technology," pp. 62-65, 1993.
Eom et al., "The roles and electrochemical characterizations of activated carbon in zinc air battery cathodes," Electrochimica Acta, vol. 52, 2006, pp. 1595-1595.
Marsch et al., "Chapter 5: Activation Processes (Thermal or Physical)," Activated Carbon, 2006, pp. 243-321.
Mirzaeian et al., "Preparation of controlled porosity carbon aerogels for energy storage in rechargeable lithium oxygen batteries," Electrochimica Acta, vol. 54, 2009, pp. 7444-7451.
Japanese Office Action, dated May 31, 2016, from corresponding Japanese Application No. 2014-532467.

* cited by examiner

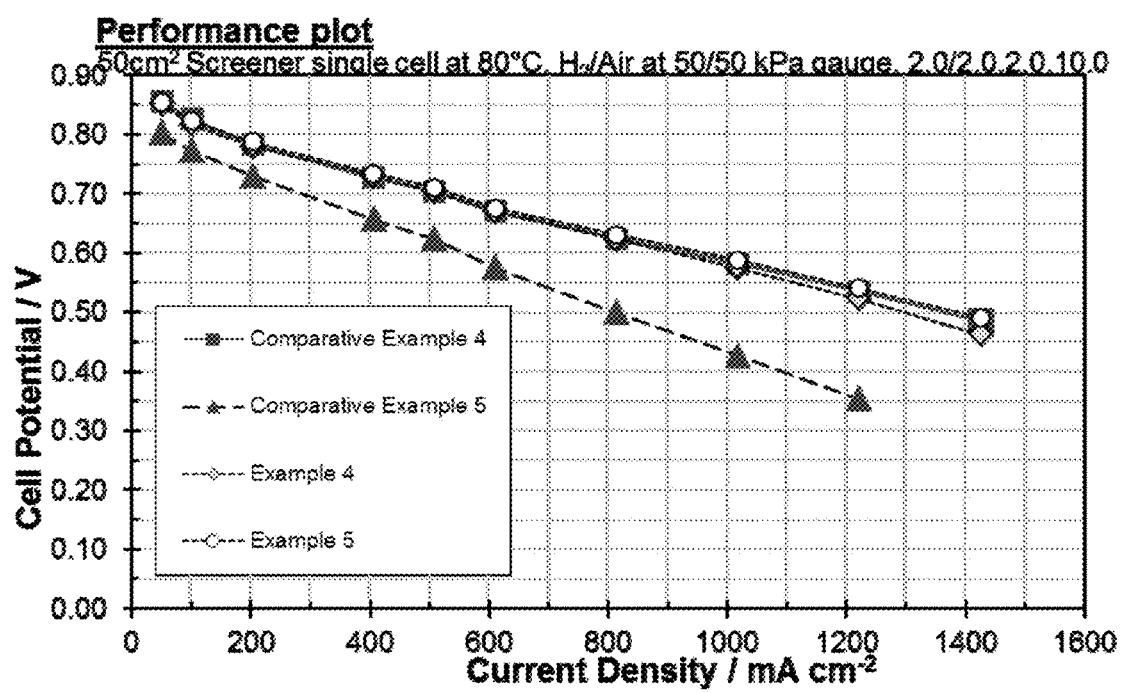
MEA performance at 50kPa gauge, 30%RH cathode/30%RH anode, 80°C, Air:Hydrogen stoichiometry 2:2 ($O_2:H_2$)

CARBON SUPPORTED CATALYST

FIELD OF THE INVENTION

The present invention relates to a novel corrosion resistant catalyst, suitable for use as an electrocatalyst in fuel cells.

BACKGROUND OF THE INVENTION

A fuel cell is an electrochemical cell comprising two electrodes separated by an electrolyte. A fuel, e.g. hydrogen, an alcohol (such as methanol or ethanol), a hydride or formic acid, is supplied to the anode and an oxidant, e.g. oxygen or air, or other oxidant such as hydrogen peroxide is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of the oxidant at the cathode.

Fuel cells are usually classified according to their electrolyte: proton exchange membrane (PEM) fuel cells including hydrogen (including reformed hydrocarbon fuel) fuel cells, direct methanol fuel cells (DMFC), direct ethanol fuel cells (DEFC), formic acid fuel cells and hydride fuel cells; alkaline electrolyte fuel cells; phosphoric acid fuel cells (including hydrogen or reformed hydrocarbon fuel); solid oxide fuel cells (reformed or unreformed hydrocarbon fuel); and molten carbonate fuel cells (hydrogen and reformed hydrocarbon fuel).

In proton exchange membrane (PEM) fuel cells, the electrolyte is a solid polymeric membrane. The membrane is electronically insulating but ionically conducting. Proton-conducting membranes are typically used, and protons, produced at the anode, are transported across the membrane to the cathode, where they combine with oxygen to create water.

The principle component of a PEM fuel cell is known as a membrane electrode assembly (MEA) and is essentially composed of five layers. The central layer is the solid polymeric membrane. On either side of the membrane there is an electrocatalyst layer, containing an electrocatalyst, which is tailored for the different requirements at the anode and the cathode. Finally, adjacent to each electrocatalyst layer there is a gas diffusion layer. The gas diffusion layer must allow the reactants to reach the electrocatalyst layer, must allow products to be removed from the electrocatalyst layer, and must conduct the electric current that is generated by the electrochemical reactions. Therefore the gas diffusion layer must be porous and electrically conducting.

The electrocatalyst layer is generally composed of a metal, (such as a platinum group metal (platinum, palladium, rhodium, ruthenium, iridium and osmium), gold or silver, or a base metal) either unsupported in the form of a finely dispersed metal powder (a metal black) or supported on an electrically conducting support, such as a high surface area carbon material. Suitable carbons typically include those from the carbon black family, such as oil furnace blacks, extra-conductive blacks, acetylene blacks and graphitised versions thereof. Exemplary carbons include Akzo Nobel Ketjen EC300J, Cabot Vulcan XC72R and Denka Acetylene Black. The electrocatalyst layers suitably comprise other components, such as ion-conducting polymer, which is included to improve the ionic conductivity within the layer. The electrocatalyst layers also comprise a certain volume fraction of porosity, which allows reactant ingress and product egress.

During normal PEM fuel cell operation, hydrogen-containing gas is fed to the anode and air to the cathode; however during shut down and start up conditions depletion of hydrogen and an ingress of air to the anode electrode can occur and results in an increase in potential at both electrodes. This so-called 'reverse current decay mechanism' can lead to high potentials in excess of 1.2V at the cathode electrode, resulting in electrochemical oxidation (corrosion) and loss of the carbon support. This process leads to a collapse in the catalyst layer structure, a loss of active catalyst metal surface area and irreversible fuel cell performance decay. An operational system will experience repeated start/stops over the lifetime of thousands of hours and therefore repeated excursions to high voltages causing corrosion and associated performance decay. Under normal operating conditions depletion of hydrogen fuel at the anode electrode whilst under load can also lead to carbon corrosion. Prolonged 'idling' of the system results in exposure of the cathode electrode to potentials around ~0.9V which could cause deterioration of the carbon support and catalyst. Operation at higher temperatures up to 120° C. is particularly desirable for automotive PEM fuel cell systems; however increasing temperature also promotes the carbon corrosion process and is therefore likely to accelerate any of the decay mechanisms described.

It is generally the case with the carbon materials used as catalyst support materials for fuel cell applications, that an increase in the total (BET) surface area results in an increase in the catalyst surface metal area, due to the formation of smaller catalyst particles, as measured by ex-situ gas phase chemisorption metal area or also the in-situ electrochemical surface area under fuel cell testing conditions. The increased catalyst surface area is often associated with an increase in the activity of the catalyst in a fuel cell environment. However, an increase in total (BET) surface area of the carbon support invariably corresponds with an increase in the corrosion of the support under fuel cell operating conditions where high potentials occur.

It is possible to improve the corrosion resistance of carbon supports through various processes, particularly high temperature graphitising treatments, but the resultant catalysts have lower active catalyst metal area and thus lower activity compared to the comparable untreated carbon supported catalysts.

It is therefore an object of the present invention to provide an improved catalyst which demonstrates both comparable activity to conventional catalysts, but which is more resistant to corrosion.

SUMMARY OF THE INVENTION

Accordingly, the present invention provides a catalyst comprising (i) a primary metal or alloy or mixture comprising the primary metal, and (ii) an electrically conductive carbon support material for the primary metal or alloy or mixture comprising the primary metal, characterised in that the carbon support material:
(a) has a specific surface area (BET) of 100-600 $m^2/g$, and
(b) has a micropore area of 10-90 $m^2/g$.

DETAILED DESCRIPTION OF THE INVENTION

The carbon support material has a specific surface area (BET) of 100 $m^2/g$ to 600 $m^2/g$, suitably 250 $m^2/g$ to 600 $m^2/g$, preferably 300 $m^2/g$ to 600 $m^2/g$. In an alternative embodiment, the carbon support material has a specific surface area (BET) of 100 m$^2$/g to 500 m$^2$/g, suitably 250 m$^2$/g to 500 m$^2$/g, preferably 300 m$^2$/g to 500 m$^2$/g. In a further alternative embodiment, the carbon support material has a specific surface area (BET) of 100 m$^2$/g to 400 m$^2$/g, suitably 250 m$^2$/g to 400 m$^2$/g, preferably 300 m$^2$/g to 400 m$^2$/g, and most preferably 100 m$^2$/g to 300 m$^2$ g. The determination of the specific surface area by the BET method is carried out by the following process: after degassing to form a clean, solid surface, a nitrogen adsorption isotherm is obtained, whereby the quantity of gas adsorbed is measured as a function of gas pressure, at a constant temperature (usually that of liquid nitrogen at its boiling point at one atmosphere pressure). A plot of $1/[V_a((P_0/P)-1)]$ vs $P/P_0$ is then constructed for $P/P_0$ values in the range 0.05 to 0.3 (or sometimes as low as 0.2), where $V_a$ is the quantity of gas adsorbed at pressure P, and $P_0$ is the saturation pressure of the gas. A straight line is fitted to the plot to yield the monolayer volume ($V_m$), from the intercept $1/V_mC$ and slope $(C-1)/V_mC$, where C is a constant. The surface area of the sample can be determined from the monolayer volume by correcting for the area occupied by a single adsorbate molecule. More details can be found in 'Analytical Methods in Fine Particle Technology', by Paul A. Webb and Clyde Orr, Micromeritics Instruments Corporation 1997.

The carbon support material also has a micropore area of 10 m$^2$/g to 90 m$^2$/g, suitably 25 m$^2$/g to 90 m$^2$/g, more suitably 40 m$^2$/g to 90 m$^2$/g when determined by the method described below. Alternatively, the carbon support material has a micropore area of 10 m$^2$/g to 80 m$^2$/g, suitably 25 m$^2$/g to 80 m$^2$/g, more suitably 40 m$^2$/g to 80 m$^2$/g when determined by the method described below. In a further alternative embodiment, the carbon support material has a micropore area of 10 m$^2$/g to 75 m$^2$/g, suitably 25 m$^2$/g to 75 m$^2$/g, more suitably 40 m$^2$/g to 75 m$^2$/g when determined by the method described below. In a further alternative embodiment, the carbon support material has a micropore area of 10 m$^2$/g to 60 m$^2$/g, suitably 25 m$^2$/g to 60 m$^2$/g, more suitably 40 m$^2$/g to 60 m$^2$/g when determined by the method described below. In a further alternative embodiment, the carbon support material has a micropore area of 10 m$^2$/g to 50 m$^2$/g, suitably 25 m$^2$/g to 50 m$^2$/g, more suitably 40 m$^2$/g to 50 m$^2$/g when determined by the method described below. In a further alternative embodiment, the carbon support material has a micropore area of 10 m$^2$/g to 45 m$^2$/g, suitably 25 m$^2$/g to 45 m$^2$/g, more suitably 40 m$^2$/g to 45 m$^2$/g when determined by the method described below. The micropore area refers to the surface area associated with the micropores, where a micropore is defined as a pore of internal width less than 2 nm. The micropore area is determined by use of a t-plot, generated from the nitrogen adsorption isotherm as described above. The t-plot has the volume of gas adsorbed plotted as a function of the standard multilayer thickness, t, where the t values are calculated using the pressure values from the adsorption isotherm in a thickness equation; in this case the Harkins-Jura equation. The slope of the linear portion of the t-plot at thickness values between 0.35 and 0.5 nm is used to calculate the external surface area, that is, the surface area associated with all pores except the micropores. The micropore surface area is then calculated by subtraction of the external surface area from the BET surface area. More details can be found in 'Analytical Methods in Fine Particle Technology', by Paul A. Webb and Clyde Orr, Micromeritics Instruments Corporation 1997.

The carbon support material also loses 20% or less, suitably 18% or less, more suitably 11% or less of its mass in an accelerated test involving a 1.2V potential hold over a 24 hour period at 80° C. The loss of carbon can be determined by the following commonly accepted test used by those skilled in the art and as described in more detail in Journal of Power Sources, Volume 171, Issue 1, 19 Sep. 2007, Pages 18-25: an electrode of the chosen catalyst or carbon is held at 1.2V in 1M $H_2SO_4$ liquid electrolyte vs. Reversible Hydrogen Electrode (RHE) and 80° C. and the corrosion current monitored over 24 hrs. Charge passed during the experiment is then integrated and used to calculate the carbon removed, assuming a 4 electron process converting carbon to $CO_2$ gas; the first 1 min of the test is not included as the charge passed during this time is attributed to the charging of the electrochemical double layer and therefore not due to corrosion processes. The mass of carbon lost during the 24 hr test is then expressed as a percentage of the initial carbon content of the electrode.

Furthermore, the carbon support material has a specific corrosion rate of less than 65%, suitably less than 60%, preferably such as less than 50%. The specific corrosion rate is determined by expressing the amount of carbon corroded as a percentage of the number of surface carbon atoms. Assuming $3.79 \times 10^{19}$ atoms m$^2$ of carbon and a four-electron process, the maximum charge required to remove one monolayer of the carbon is determined. The experimentally determined charge associated with carbon corrosion is then expressed as a percentage of a monolayer, giving the specific corrosion rate.

The electrically conductive carbon support material can be obtained by functionalization of a pre-existing carbon material. Functionalization or activation of carbon has been described in the literature and is understood in the case of physical activation as a post treatment of carbon with gases like oxygen or air, carbon dioxide, steam, ozone, or nitrogen oxide or in the case of a chemical activation as a reaction of the carbon pre-cursor with solid or liquid reagents like KOH, $ZnCl_2$ or $H_3PO_4$ at elevated temperatures. Examples of such functionalization or activation are described by H. Marsch and F. Rodriguez-Reinoso in 'Activated Carbon', Elsevier Chapter 5 (2006). During the activation process parts of the carbon is lost by the chemical reaction or burn-off.

The activation of carbon black is typically performed with oxidizing gases such as oxygen, ozone, hydrogen peroxide, or nitrogen dioxide which, as well as leading to an increase of the specific surface area, also leads to an increasing amount of surface groups. Activation can also be performed by air, carbon dioxide or steam treatment, which mainly affects the carbon black porosity, for example as described in 'Carbon Black' (J-B. Donnet, R. C. Bansal and M-J Wang (eds.), Taylor & Francis, 62-65 (1993)).

Suitably, the primary metal is selected from
(i) the platinum group metals (platinum, palladium, rhodium, ruthenium, iridium and osmium), or
(ii) gold or silver, or
(iii) a base metal
or an oxide thereof.

The primary metal may be alloyed or mixed with one or more other precious metals such as ruthenium, or base metals such as molybdenum, tungsten, cobalt, chromium, nickel, iron, copper or an oxide of a precious metal or base metal. In a preferred embodiment, the primary metal is platinum.

The primary metal, in the catalyst of the invention, has a gas phase metal area, determined using gas phase adsorption of carbon monoxide (CO), of at least 30 m$^2$/g, suitably at least 45 m$^2$/g, more preferably at least 60 m$^2$/g, The gas phase CO metal area is determined by reducing the catalyst in hydrogen, then titrating aliquots of CO gas until there is no more uptake. The moles of CO absorbed can then be converted into a metal surface area, by assuming $1.25 \times 10^{19}$ atoms/m$^2$ for Pt as defined in 'Catalysis—Science and Technology, Vol 6, p 257, Eds J. R. Anderson and M. Boudart. A high Pt surface area determined by this method is well known to translate to high electrochemical surface area under fuel cell testing conditions.

The loading of primary metal particles on the carbon support material is suitably in the range 5-95 wt %, preferably 5-75 wt %. The actual loading of the primary metal particles on the carbon support material will be dependent on the ultimate use of the catalyst. For example, for use in a proton exchange membrane fuel cell, the loading will ideally be in the rage of 30-95 wt %, preferably 35-75 wt %; for use in a phosphoric acid fuel cell, the loading will ideally be in the range of 5-25 wt %. The skilled person would know what a suitably loading would be for the given application.

The catalysts of the invention have utility in fuel cells and other electrochemical devices. Accordingly, a further aspect of the invention provides an electrode, either anode or cathode, comprising a gas diffusion layer (GDL) and a catalyst according to the invention. In one embodiment, the electrode is the cathode and may provide improved stability; in a second embodiment, the electrode is the anode, and may show particular benefit under cell reversal conditions. The catalyst layer can be deposited onto a GDL using well known techniques, such as those disclosed in EP 0 731 520. The catalyst layer components may be formulated into an ink, comprising an aqueous and/or organic solvent, optional polymeric binders and optional proton-conducting polymer. The ink may be deposited onto an electronically conducting GDL using techniques such as spraying, printing and doctor blade methods. Typical GDLs are fabricated from substrates based on carbon paper (e.g. Toray® paper available from Toray Industries, Japan or U105 or U107 paper available from Mitsubishi Rayon, Japan), woven carbon cloths (e.g. the MK series of carbon cloths available from Mitsubishi Chemicals, Japan) or non-woven carbon fibre webs (e.g. AvCarb series available from Ballard Power Systems Inc, Canada; H2315 series available from Freudenberg FCCT KG, Germany; or Sigracet® series available from SGL Technologies GmbH, Germany). The carbon paper, cloth or web is typically modified with a particulate material either embedded within the layer or coated onto the planar faces, or a combination of both to produce the final GDL. The particulate material is typically a mixture of carbon black and a polymer such as polytetrafluoroethylene (PTFE). Suitably the GDLs are between 100 and 400 µm thick. Preferably there is a layer of particulate material such as carbon black and PTFE on the face of the GDL that contacts the catalyst layer.

Alternatively, the substrate onto which the catalyst of the invention is applied may be a preformed gas diffusion electrode, either an anode or a cathode i.e. a GDL (which may be as described above) which already has applied thereto a catalyst layer. The catalyst layer in the preformed gas diffusion electrode may comprise a catalyst according to the invention or may comprise a conventional catalyst as applied by conventional techniques, for example screen printing.

In PEM fuel cells, the electrolyte is a solid polymeric membrane. Electrocatalysts may be deposited onto one or both faces of the solid polymeric membrane to form a catalysed membrane. In a further aspect the present invention provides a catalysed membrane comprising a solid polymeric membrane and a catalyst of the invention. The catalyst can be deposited onto the membrane using well known techniques. The catalyst may be formulated into an ink and either directly deposited onto the membrane or deposited onto a decal blank for subsequent transfer to a membrane. One or more additional catalyst (for example Pt, PtRu) may subsequently be applied to the catalysed membrane to form a catalysed membrane having two or more catalyst layers. The one or more additional catalyst layers may comprise a catalyst according to the invention or may comprise a conventional catalyst as applied by conventional techniques, for example screen printing.

The membrane may be any membrane suitable for use in a fuel cell, for example the membrane may be based on a perfluorinated sulphonic acid material such as Nafion® (DuPont), Flemion® (Asahi Glass) and Aciplex® (Asahi Kasei); these membranes may be used unmodified, or may be modified to improve the performance and durability, for example by incorporating an additive. Alternatively, the membrane may be based on a sulphonated hydrocarbon membrane such as those available from Polyfuel, JSR Corporation, FuMA-Tech GmbH and others. The membrane may be a composite membrane, containing the proton-conducting material and other materials that confer properties such as mechanical strength. For example, the membrane may comprise a proton-conducting membrane and a matrix of silica fibres, as described in EP 0 875 524 or the membrane may comprise an expanded PTFE substrate. Alternatively, the membrane may be based on polybenzimidazole doped with phosphoric acid and include membranes from developers such as BASF Fuel Cell GmbH, for example the Celtec®-P membrane which will operate in the range 120° C. to 180° C. The catalyst layer of the invention is also suitable for use with membranes that use charge carriers other than proton, for example OH$^-$ conducting membranes such as those available from Solvay Solexis S.p.A., FuMA-Tech GmbH.

In a further embodiment of the invention, the substrate onto which the catalyst of the invention is applied is a transfer substrate. Accordingly, a further aspect of the present invention provides a catalysed transfer substrate comprising a transfer substrate and a catalyst of the invention. The transfer substrate may be any suitable transfer substrate known to those skilled in the art but is preferably a polymeric material such as polytetrafluoroethylene (PTFE) or polypropylene (especially biaxially-oriented polypropylene, BOPP) or a polymer-coated paper such as polyurethane coated paper. The transfer substrate could also be a silicone release paper or a metal foil such as aluminium foil. The catalyst of the invention may then be transferred to a GDL, gas diffusion electrode, membrane or catalysed membrane by techniques known to those skilled in the art.

In PEM fuel cells, the solid polymeric membrane is interposed between two catalyst layers, and each catalyst layer is in contact with an electronically conducting substrate. This five-layer assembly is known as a membrane electrode assembly. A further embodiment of the invention provides a membrane electrode assembly (MEA) comprising a catalyst of the invention. The MEA may be made up in a number of ways including, but not limited to:

(i) a solid polymeric membrane may be sandwiched between two gas diffusion electrodes (one anode and one cathode), at least one of which is an electrode according to the present invention;

(ii) a catalysed membrane coated on one face only by a catalyst may be sandwiched between (i) a GDL and a gas diffusion electrode, the GDL contacting the catalysed face of the catalysed membrane, or (ii) two gas diffusion electrodes, and wherein at least one of the catalysed membrane and the gas diffusion electrode adjacent to the uncatalysed face of the catalysed membrane is according to the present invention;

(iii) a catalysed membrane coated on both faces with a catalyst may be sandwiched between (i) two GDLs, (ii) a GDL and a gas diffusion electrode or (iii) two gas diffusion electrodes, and wherein the catalyst coating on at least one face of the catalysed membrane is according to the invention.

The MEA may further comprise components that seal and/or reinforce the edge regions of the MEA for example as described in WO2005/020356. The MEA is assembled by conventional methods known to those skilled in the art.

The MEA may be used in a fuel cell stack, for example a PEM fuel cell, a direct methanol fuel cell (DMFC), a high temperature fuel cell (for use at temperatures in the range of 100° C. to 250° C.) or an alkali fuel cell. Accordingly, a further aspect of the invention provides a fuel cell comprising a MEA of the invention. The MEA may be incorporated into the fuel cell using conventional methods.

Alternatively, an electrode of the invention may be used directly in a fuel cell, for example a phosphoric acid fuel cell wherein the electrolyte is liquid phosphoric acid in a supporting matrix, for example silicon carbide. Accordingly, a further aspect of the invention provides a fuel cell, in particular a phosphoric acid fuel cell, which comprises an electrode of the invention. Such fuel cells may be operated in the range of from 150° C. to 210° C.

The invention will now be further described with reference to the following examples, which are illustrative and not limiting of the invention.

Carbon Support Materials

The carbon support materials used in the Examples are as described below:
  Comparative Example 1: Ensaco™ 250G available from Timcal Ltd
  Comparative Example 2: Ensaco™ 350G available from Timcal Ltd
  Comparative Example 3: Vulcan XC-72R available from Cabot Corporation
  Comparative Example 4: Ketjen EC 300J available from Akzo Nobel
  Comparative Example 5: Ketjen EC 300J graphitised at high temperature>2000° C.

Carbons for Examples 1 to 7 were prepared by physical functionalization of granulated highly structured conductive carbon black Ensaco® 250G (Comparative Example 1) in a fluidized bed reactor. The carbon material (800-1200 g) was introduced in the reaction chamber at room temperature. A flow of inert gas (nitrogen) was introduced in order to fluidize the carbon material. The chamber was slowly heated up to 800°-1100° C., where it was kept at constant temperature with a flow of reacting gas for a time ranging between 30 minutes and 4 hours. The reacting gas used was air, carbon dioxide, or steam. The reaction time controlled the degree of the post treatment with the individual gas at a given gas flow and reactor design. Thereafter the reaction chamber with the post treated carbon material was left to cool down to room temperature under a flow of inert gas.

Preparation of Catalyst

General Method of Preparation

The carbon support material (1 g) was dispersed in water (150 ml) using a shear mixer. The slurry was transferred to a beaker (if required with 50 ml additional water), fitted with temperature and pH probes and two feed inlet tubes connected to a pH control unit. The Pt salt (Pt nitrate or $K_2PtCl_4$) was added in an amount sufficient to give a nominal loading of 60 wt % Pt (Examples 1 to 5) and a nominal loading of 50 wt % Pt (Examples 6 and 7). NaOH was added to maintain the pH between 5.0 and 7.0 (final pH). The slurry was stirred and once hydrolysis was complete, formaldehyde was added to reduce the Pt. Once the reaction was complete, the catalyst was recovered by filtration and washed on the filter bed. The material was dried overnight at 105° C. Properties of the carbon and catalysts prepared therefrom are given in Table 1.

TABLE 1

Properties of carbon supports and catalysts

| Example | Carbon surface area ($m^2/g$) Total (BET) | Carbon Surface Area in Micropores | Corrosion Test (1.2 V, 24 hours, 80° C.) Absolute corrosion wt % carbon loss | Corrosion Test Specific corrosion % monolayer corroded | Gas phase metal area (CO) ($m^2/g$) |
|---|---|---|---|---|---|
| Comparative Example 1 | 65 | 5 | 2.5 | 52 | 29 |
| Comparative Example 2 | 751 | 117 | 24 | 42 | 70 |
| Comparative Example 3 | 226 | 96 | 12 | 67 | 65 |
| Comparative Example 4 | 846 | 169 | 32 | 51 | 90 |
| Comparative Example 5 | 124 | 7 | 1 | 10 | 28 |
| Example 1 | 110 | 28 | 5.3 | 64 | 34 |
| Example 2 | 196 | 40 | 7.2 | 49 | 36 |
| Example 3 | 262 | 41 | 9.7 | 49 | 45 |
| Example 4 | 337 | 42 | 9.1 | 37 | 43 |
| Example 5 | 396 | 33 | 9 | 26 | 60 |
| Example 6 | 541 | 74 | 16.6 | 41 | 71 |
| Example 7 | 466 | 65 | 17.8 | 51 | 62 |

Examples 1-7 were prepared by application of the carbon treatment process to Comparative Example 1. The total BET surface area of Examples 1 to 7 was increased by the application of the carbon treatment process and this resulted in an associated increase in Pt surface area on catalysing the carbon supports.

Preparation of Example 1 from Comparative Example 1 via the treatment process resulted in an increase in total BET area, micropore area and slight increase in absolute and specific corrosion rates. Thereafter, through Examples 1-7 on application of the treatment process, the overall carbon BET surface area increased, the proportion of area in micropores decreased accompanied by a decrease in the specific corrosion rate. This resulted in a plateauing of the absolute corrosion determined by wt % carbon loss. Thus the application of the treatment process creates a support surface that is less intrinsically corrodible (exhibiting a lower specific corrosion rate), such that a carbon with greater overall BET surface area (Examples 3, 4 and 5) can show lower absolute corrosion than a commercial carbon with lower BET surface area (such as Comparative Example 3).

Comparative Example 5 is representative of a carbon support prepared by graphitisation of a high surface area carbon support by heat treatment at high temperature >2000° C. These typically have low BET areas and low surface area in micropores; however exact properties are dependent on the graphitisation temperature. Typically catalysation of such carbon supports results in low Pt dispersion due to the lower surface functionality of the graphitised carbon support.

Performance Data

The catalysts prepared in Comparative Examples 4 and 5 and Examples 4 and 5 were used to prepare electrodes. The catalysts (Comparative Examples and catalysts of the invention) were formulated into inks using the techniques outlined in EP 0 731 520 and used to prepare cathode electrocatalyst layers at a total metal loading of 0.4 mgPt/cm². The anode comprised a conventional Pt/C catalyst at a loading of 0.4 mgPt/cm². MEAs were fabricated by hot pressing the anode and cathode either side of a 30 micron PFSA membrane. Samples were tested as 50 cm² MEAs and initially conditioned at 100% relative humidity for several hours. The cathode and anode relative humidities were then reduced to 30% and the sample reconditioned for up to 8 hrs, at 50 kPa gauge, 80° C., 0.5 A/cm² on $H_2$/Air, stoichiometry 2:2 $H_2/O_2$ until stable performance was achieved. Air polarisation curves were then measured. FIG. 1 shows single cell performance data for cathode catalyst layers containing the electrocatalysts of Examples 4 and 5 and Comparative Examples 4 and 5 at 80° C. The performance of the electrodes containing the Examples of the invention is comparable to that of Comparative Example 4 and yet the catalysts in the electrodes of the invention are considerably more corrosion resistant. In addition samples of the invention show significantly enhanced performance under the 30% RH dry conditions used compared to Pt on graphitised carbon Comparative Example 5, associated with only a moderate increase in corrosion rate from 1 to 10% wt C (Comparative Example 5 compared to Comparative Examples 4 and 5).

The invention claimed is:

1. An electrode comprising a gas diffusion layer and a catalyst, wherein the catalyst comprises:
    (i) a primary metal, or an alloy or mixture comprising the primary metal, and
    (ii) an electrically conductive carbon support material for said primary metal, alloy or mixture, wherein the carbon support material:
        (a) has a specific surface area (BET) of 300-600 m²/g, and
        (b) has a micropore area of 25-60 m²/g.

2. The electrode according to claim 1, wherein the carbon support material loses 20% or less of its mass in an accelerated test involving a 1.2V potential hold over a 24 hour period at 80° C.

3. The electrode according to claim 1, wherein the carbon support material has a specific corrosion rate of less than 65%.

4. The electrode according to claim 2, wherein the carbon support material has a specific corrosion rate of less than 65%.

5. The electrode according to claim 1, wherein the primary metal is selected from the group consisting of
    (i) the platinum group metals of platinum, palladium, rhodium, ruthenium, iridium and osmium,
    (ii) gold, silver, and
    (iii) a base metal
    or an oxide thereof.

6. The electrode according to claim 1, wherein the primary metal has a gas phase metal area of at least 30 m²/g.

7. The electrode according to claim 1, wherein the loading of primary metal particles on the carbon support material is in the range 5-95 wt %.

8. A catalysed membrane comprising a solid polymeric membrane and a catalyst, the catalyst comprising:
    (i) a primary metal, or an alloy or mixture comprising the primary metal, and
    (ii) an electrically conductive carbon support material for said primary metal, alloy or mixture, wherein the carbon support material:
        (a) has a specific surface area (BET) of 300-600 m²/g,
        (b) has a micropore area of 25-60 m²/g.

9. A catalysed transfer substrate comprising a transfer substrate and the catalyst as defined in claim 1.

10. A membrane electrode assembly comprising the electrode as claimed in claim 1.

11. A fuel cell comprising the membrane electrode assembly as claimed in claim 10.

12. A fuel cell comprising the electrode according to claim 1.

13. The electrode according to claim 1, wherein the primary metal is platinum.

14. The fuel cell according to claim 11, wherein the fuel cell is a proton exchange membrane fuel cell and the loading of primary metal particles on the carbon support material is in the range of 35-75 wt %.

15. The fuel cell according to claim 11, wherein the fuel cell is a phosphoric acid fuel cell and the loading of primary metal particles on the carbon support material is in the range 5-25 wt %.

16. The catalyzed membrane according to claim 8, wherein the carbon support material loses 20% or less of its mass in an accelerated test involving a 1.2V potential hold over a 24 hour period at 80° C.

17. The catalyzed membrane according to claim 8, wherein the carbon support material has a specific corrosion rate of less than 65%.

18. The catalyzed membrane according to claim 8, wherein the primary metal is selected from the group consisting of
    (i) the platinum group metals of platinum, palladium, rhodium, ruthenium, iridium and osmium,
    (ii) gold, silver, and
    (iii) a base metal
    or an oxide thereof.

19. The catalyzed membrane according to claim 8, wherein the primary metal has a gas phase metal area of at least 30 m²/g.

20. The catalyzed membrane according to claim 8, wherein the loading of primary metal particles on the carbon support material is in the range 5-95 wt %.

21. A membrane electrode assembly comprising the catalyzed membrane according to claim 8.

22. A fuel cell comprising the membrane electrode assembly according to claim 21.

23. A fuel cell comprising the catalyzed membrane according to claim 8.

24. The catalyzed membrane according to claim 8, wherein the primary metal is platinum.

25. The fuel cell according to claim 22, wherein the fuel cell is a proton exchange membrane fuel cell and the loading of primary metal particles on the carbon support material is in the range of 35-75 wt %.

26. The fuel cell according to claim 22, wherein the fuel cell is a phosphoric acid fuel cell and the loading of primary metal particles on the carbon support material is in the range 5-25 wt %.

27. The electrode according to claim 1, wherein the electrically conductive carbon support material comprises carbon black, and the carbon black has been treated with at least one gas selected from the group consisting of oxygen, ozone, hydrogen peroxide, nitrogen dioxide, air, carbon dioxide and steam.

28. The electrode according to claim 27, wherein the carbon black is treated at a temperature between 800° C. and 1100° C.

29. The electrode according to claim 27, wherein the carbon black is treated for a time ranging between 30 minutes and 4 hours.

30. The catalyzed membrane according to claim 8, wherein the electrically conductive carbon support material comprises carbon black, and the carbon black has been treated with at least one gas selected from the group consisting of oxygen, ozone, hydrogen peroxide, nitrogen dioxide, air, carbon dioxide and steam.

31. The catalyzed membrane according to claim 30, wherein the carbon black is treated at a temperature between 800° C. and 1100° C.

32. The catalyzed membrane according to claim 30, wherein the carbon black is treated for a time ranging between 30 minutes and 4 hours.

* * * * *